(12) United States Patent  
Tormasov et al.

(10) Patent No.: US 7,076,633 B2  
(45) Date of Patent: Jul. 11, 2006

(54) HOSTING SERVICE PROVIDING PLATFORM SYSTEM AND METHOD

(75) Inventors: Alexander Tormasov, Moscow (RU); Dennis Lunev, Chernogolovka Moscow region (RU); Serguei Beloussov, Singapore (SG); Stanislav Protassov, Singapore (SG); Yuri Pudgorodsky, Moscow (RU)

(73) Assignee: SWSoft Holdings, Ltd. (BM)

( * ) Notice: Subject to any disclaimer, the term of this patent is extended or adjusted under 35 U.S.C. 154(b) by 445 days.

(21) Appl. No.: 10/005,590

(22) Filed: Oct. 26, 2001

(65) Prior Publication Data

US 2002/0143906 A1 Oct. 3, 2002

Related U.S. Application Data

(60) Provisional application No. 60/279,335, filed on Mar. 28, 2001.

(51) Int. Cl.
*G06F 12/00* (2006.01)

(52) U.S. Cl. .................... 711/203; 709/226
(58) Field of Classification Search ........... 709/223, 709/226, 324, 104, 229, 225, 201, 220; 711/203, 711/209, 202

See application file for complete search history.

(56) References Cited

U.S. PATENT DOCUMENTS

| | | | |
|---|---|---|---|
| 5,961,582 A * | 10/1999 | Gaines | 718/1 |
| 6,026,474 A * | 2/2000 | Carter et al. | 711/202 |
| 6,173,374 B1 * | 1/2001 | Heil et al. | 711/148 |
| 6,438,705 B1 * | 8/2002 | Chao et al. | 714/4 |
| 6,701,437 B1 * | 3/2004 | Hoke et al. | 709/245 |
| 6,757,778 B1 * | 6/2004 | van Rietschote | 711/6 |
| 6,779,016 B1 | 8/2004 | Aziz et al. | |
| 6,823,462 B1 * | 11/2004 | Cheng et al. | 709/227 |
| 2002/0049803 A1 | 4/2002 | Bandhole et al. | |
| 2002/0055989 A1 * | 5/2002 | Stringer-Calvert et al. | 709/220 |
| 2002/0091697 A1 * | 7/2002 | Huang et al. | 707/10 |
| 2002/0095496 A1 * | 7/2002 | Antes et al. | 709/225 |
| 2002/0143960 A1 * | 10/2002 | Goren et al. | 709/229 |
| 2002/0147815 A1 * | 10/2002 | Tormasov et al. | 709/226 |
| 2002/0188657 A1 * | 12/2002 | Traversat et al. | 709/201 |
| 2003/0037134 A1 * | 2/2003 | Hickman | 709/223 |

OTHER PUBLICATIONS

"Virtual PC for Windows," Connectix, Version 5.0, 2002, 2 pages. Dave Gardner, et al., "Wine Faq,", .Copyrgt. David Gardner 1995-1998, printed from www.winehq.org, 13 pages.*

"What is Virtual Environment(VE)?," SWsoft, http://www.sw-soft/en/products/virtuozzo/we/, .COPYRGT. 1994-2002 SWsoft, printed from web on Dec. 13, 2002, 2 pages.*

"The Technology of Virtual PC," A Conneectix White Paper, Connectix Corp., 2000, 12 pages.*

(Continued)

*Primary Examiner*—Pierre-Michel Bataille

(57) ABSTRACT

The present invention is a system and method for utilization of computer clusters with automatic configuration and virtual environments integrated with a distributed file system as a hosting service providing platform. The virtual environment of the present invention emulates no hardware and is essentially a personal protected machine with an independent operating system that functions as a separate workstation or server.

42 Claims, 5 Drawing Sheets

OTHER PUBLICATIONS

Connectix Ships Virtual PC With Windows 2000, http://www.macobserver.com/news/00/march/000327/vpcw2k.shtml, Mar. 27, 2000.*

Virtual PC 4 Special Report, http://www.macwindows.com/VPC4.html.*

Special Report: Interview with Connectix CEO Roy McDonald, http://www.macwindows.com/MW99conn.html, Jan. 7, 1999.*

Speech Transcript—Rick Rashid, PC Futures '98, http://www.microsoft.com/presspass/exec/rick/6-11pcfutures.mspx, Jun. 11, 1998.*

"(Webopēdia) The #1 online encyclopedia dedicated to computer technology". http://www.pcwebopedia.com/TERM/m/mainframe.html, p. 1.

Crowley, Charles. "Operating Systems: a design-oriented approach". Irwin, 1997, pp. 753, 757.

Tanenbaum, Andrew S. "Distributed Operating Systems". Prentice Hall, 1994, pp. 246-249.

Network Working Group. "Request for Comments: 1945 Hypertext Transfer Protocol—HTTP/1.0". http://www.faqs.org/rfcs/rfc1945.html.

Eckel, George. "Building a UNIX Internet Server". New Riders Publishing, 1995, pp. 10-13, 46-47.

"The Common Gateway Interface". http://hoohoo.ncsa.uiuc.edu/cgi.

Carter, Todd W. Beginner's Guide to ASP: Introduction. May 9, 2000. http://www.aspstreet.com/archive/d.taf, (6 pages).

"z/VM V4 R2.0 General Information Manual". http://www.vm.ibm.com/pubs/pdf/hcsf8a41.pdf, pp. 11-12.

VMware workstation user's manual. http://www.vmware.com/pdf/ws30_manual.pdf, pp. 12-13.

"Farsite Overview", retrieved from the Internet on Jul. 1, 2004: <URL:http://research.microsoft.com/research/sn/Farsite/overview.htm>, pp. 1-2.

* cited by examiner

HOSTING SERVICE PROVIDING PLATFORM SYSTEM AND METHOD

This patent application claims the benefit of U.S. Provisional Patent Application Ser. No. 60/279,335 filed Mar. 28, 2001.

In compliance with 37 C.F.R. § 1.121(b)(3), please replace the specification submitted on Oct. 26, 2001 with the substitute specification included hereinbelow. The substitute specification includes no new matter in compliance with 37 C.F.R. § 1.125(b). Also enclosed as Attachment "A" is a marked up version of the substitute specification.

FIELD

The present invention pertains to a computer hosting service; more particularly, the present invention describes a computer hosting service providing a platform system and method where computer clusters serving as a platform are configured automatically and have a system of virtual environments (VE) integrated with a distributed file system.

BACKGROUND

The task of providing a computer hosting service arose with the onset of linking computers together. The idea of providing a set of application services by a particular server to outside personal computer users arose with the creation of shared access centers. Generally, these shared access centers consisted of mainframe computers (term described in http://www.pcwebopedia.com/TERM/m/mainframe.html) which allowed user access to some services, such as booking offices.

The rapid growth of the Internet and the need for remote access to servers profoundly increased the demand for a computer hosting service. The growing need for quality and efficiency of both Internet access channels and servicing computers led to the rapid growth in the creation of data centers and the services they provide.

The provision of remote computer hosting service is based on the client-server concept. (*Operating Systems: a design oriented approach*, Charles W. Crowley. Irwin. 1997. ISBN 0-256-15151-2.) The problem of shared access to files, for instance, can be efficiently solved using a client-server model. Traditionally, the problem of shared access to files was dealt with by providing a corresponding service to one of the network computers, e.g., by means of a file server. When a file server was used, software installation was required to allow the other computers to work with files located at the corresponding server. This functionality was achieved by copying the files locally or by emulating access to the network files for files located at a virtual local disk. For instance, the DOS software developed for the operating systems of IBM PC compatible computers has been organized in exactly this way. Client software, properly connected to both the network and the corresponding file server, displayed the so-called network drive. (*Distributed Operating Systems*, Andrew S. Tanenbaum, 1994. Prentice Hall. ISBN: 0132199084.) As a result, the locally launched software of a client will work with remote files in the same manner as if the remote files were placed on a local hard drive.

More sophisticated problems occur when the server and services are spaced far apart and linked together by the Internet global network, e.g., files at a server to which access is provided by special network protocols such as the http-World Wide Web service-protocol (*Network Working Groiup* "Request for Comments: 1945 Hypertext Transfer Protocol—HTTP/1.0".) These protocols are intentionally tailored to function in a distributed client-server network with connections which are looser than those found in a local network such as described above.

Servicing such a protocol requires WWW server installation with a stable Internet connection plus regular computer and service functioning. Such services require substantial capital investments and are primarily available in the data centers. Only the professional computer centers can render safe and dedicated Internet access lines, surplus power supply, cooling, and fire/damage protection.

Typically, data center customers receive the following services and equipment:
- dedicated data center-owned computer with network access fully operated by the customer
- installation of the customer's computer in the data center, i.e., collocation service; and
- a data center computer partially operated by a customer for use of services provided at the discretion of the data center.

The last service mentioned above may occur if the data center has specially trained personnel and software. Usually a separate department or an independent company carries out this service while a data center simply provides all the necessary equipment. Today, such companies frequently provide the "web hosting" or, in other words, permit the providers' web servers to be filled with independent contents. (*Building a UNIX Internet Server*, George Eckel. 1995. New Riders Publishing. ASIN: 1562054945.)

Traditionally, web-hosting companies render their own web-servers as they are, without any configuration modifications. Installation of the so-called scripts or executable CGI files (*The Common Gateway Interface*. http://hoohoo.ncsa.uiuc.edu/cgi/overview.html), written in a Perl-type interpretive language, may present certain difficulties. The scripts should be executed at the server together with instructions received from users. Usually the scripts are used for dynamic generation of web page content. Most active servers have long been generating almost all of their pages by this "on-the-fly" technique. However, mutual utilization of these applications may cause a number of difficulties, including versions of language interpreters, web-servers and web-server configurations, incorrectly written applications, and associated server failure, plus loss of security and unauthorized access to data.

Under the prior art scheme described above, users get access to the shared server but are not able to modify the shared server configuration to their preferences and needs (See FIG. 1). Scripts that are launched in the common environment for all users and any script with the slightest problem immediately influence every participant of the scheme.

The set of required uses goes beyond web-hosting to include such widespread services as e-mail and ftp services of electronic mail and file access. Difficulties arising under their functioning are similar to those of the Www service described earlier. Moreover, users often prefer access to a separate computer connected to the Internet, i.e., via telnet or secure shell connection.

In today's market, Application Service Providers (ASP) represent another class of hosting services that are in demand. Usually, Application Service Providers provide shared access to a shared application such as a database, which is installed and administered by the provider's system engineer. (*Beginner's Guide to ASP*. http://www.aspstreet.com/archive/d.taf/sid,14/id,715.) User access is restricted to the database alone. Access to office applications, for example, is practically impossible as their installation implies that there is only one user. Security of data access is yet another problem.

Presently available services are generally limited to web/email/ftp servers or services which allow users to install a dedicated computer independently and then to be responsible for its administration.

Applications-emulators of an operating system may be potentially used for personal remote computers. The series of operating systems, the latest one called "z/VM", applied in IBM systems software, appears to be among the first of such emulator products. When applied, the users receive a full-sized computer with emulating hardware and the opportunity to install their own version of an operating system. (*z/VM V4 R2.0 General Information Manual.* http://www.vm.ibm.com/pubs/pdf/hcsf8a41.pdf.) Both hardware and software in this case must meet a high standard of quality and are consequently very costly. Only companies with qualified personnel and adequate start-up capital for the initial system installation choose this option.

Until recently, similar systems with the much cheaper IBM PC compatibles have not met the technical requirements. Nearly complete emulation of hardware by software and the functioning of two kernels of operating system (one on top of another on the same computer) has resulted in a small scalability with high maintenance overhead. (*VMware Workstation User's Manual.* http://www.vmware.com/pdf/ws30_manual.pdf.) Users working in such an environment typically become dissatisfied with the resources consumed and the emulator performance proportion. An insufficient level of hardware specialization has made these methods impractical with the IBM PC architecture for mass customer servicing.

Nevertheless, the problem of providing high quality, efficient computer hosting services persists and remains unsolved. There is a need in the art for improved unification and simplification for both users and administrators. For simplicity and to ease hardware emulation, a small set of options, available at the operating system inside the emulator, would be preferable. The installation process and system support should be simplified. Maintenance and Administration of the underlying operating system should be streamlined and require fewer resources. Such virtualized pseudo-hardware should be less diverse and require less maintenance than real data center hardware. Such a system should narrow support to highly unified configurations in order to simplify the work of system engineers and administrators and allow the development of efficient control and monitoring software for the entire complex.

Additionally, there exists a need to minimize the users' physical access to the network and computer hardware. This is another big problem for data centers. Today, client service at data centers requires that clients have extensive physical access to their own computers. Thus, data center management is forced to use high-end control and access-providing technologies that require expensive and not necessarily effective security measures against physical damage. Such measures include secured vaults, anti-bombing devices and protection against access to data center equipment and data center customers' computers. However, such a need for frequent hardware access is often caused by the outdated computer organization employed. User access and physical contact with hardware is inevitable when users alone can get the computer reloaded by means of special repairing disks. What is needed is a system and method which does more than simply reducing such contacts but also completely eliminates procedures of this kind and vests rights of hardware interference with the data center personnel only.

SUMMARY

This invention is directed to a system and method for utilization of computer clusters with automatic configuration and virtual environments that are integrated with a distributed file system as a platform for providing hosting services. The virtual environment of the present invention emulates no hardware and is essentially a personal protected machine with an independent operating system that functions as a separate workstation or server.

The virtual environments on the same computer are completely isolated from each other, yet are highly unified, with simple, well-formulated, and economical installation and maintenance. The system permits all private data from every virtual environment to be visible at every participating computer. Thus, all virtual environments may be restarted at any computer of the cluster. Additionally, every virtual environment may be easily moved from one computer to another.

In the present invention, a set of virtual environments is launched and several computers are combined with a distributed file system and a control center into a sharable cluster. End users are linked to their virtual environments via the Internet. Administration is carried out through the control center by means of the Internet or local network. Installation, repairs, and backup are accomplished simply and efficiently. Cluster functioning is primarily accomplished without administrator participation. Thus, the present invention promotes efficient control and monitoring of the entire system by the data center personnel and minimizes the users' physical access to the network and computer hardware. Such controlled access and protection of data integrity enhance system security and reliability.

BRIEF DESCRIPTION OF THE DRAWINGS

A better understanding of the hosting service providing platform system and method of the present invention may be had by reference to the drawing figures, wherein.

DETAILED DESCRIPTION OF THE EMBODIMENTS

Figure 1:
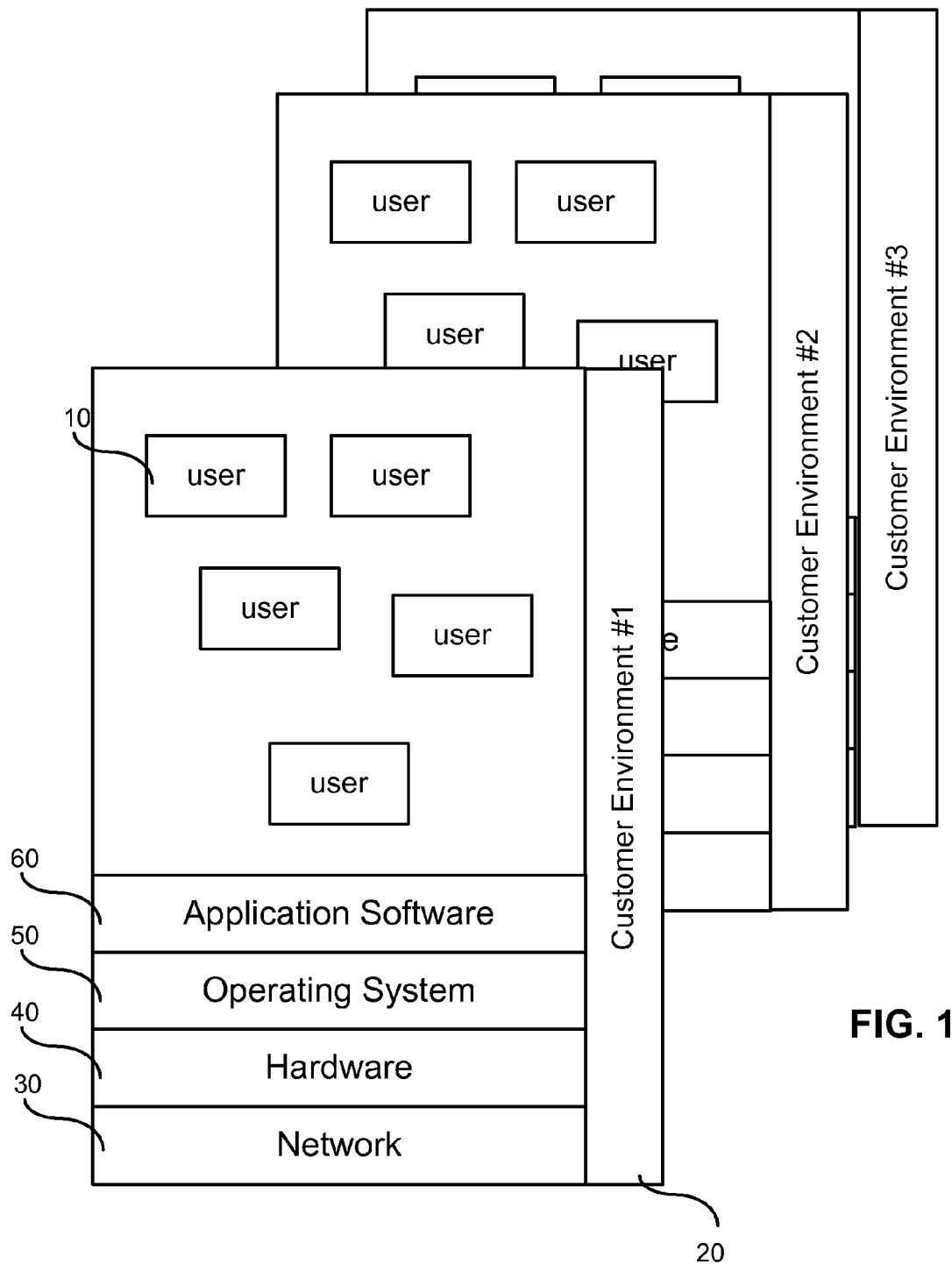
FIG. 1 is schematic of the traditional architecture used for work organization of computers and users.

As shown in FIG. 1, the traditional architecture 100 used for work organization of computers and users included a customer environment 20 consisting of network access 30, hardware 40, operating system 50, and application software 60. The environment 20 was accessed by multiple users 10 and the architecture was duplicated for every customer environment.

In lieu of this configuration, the present invention suggests the utilization of a virtual environment for providing hosting services.

Figure 2:
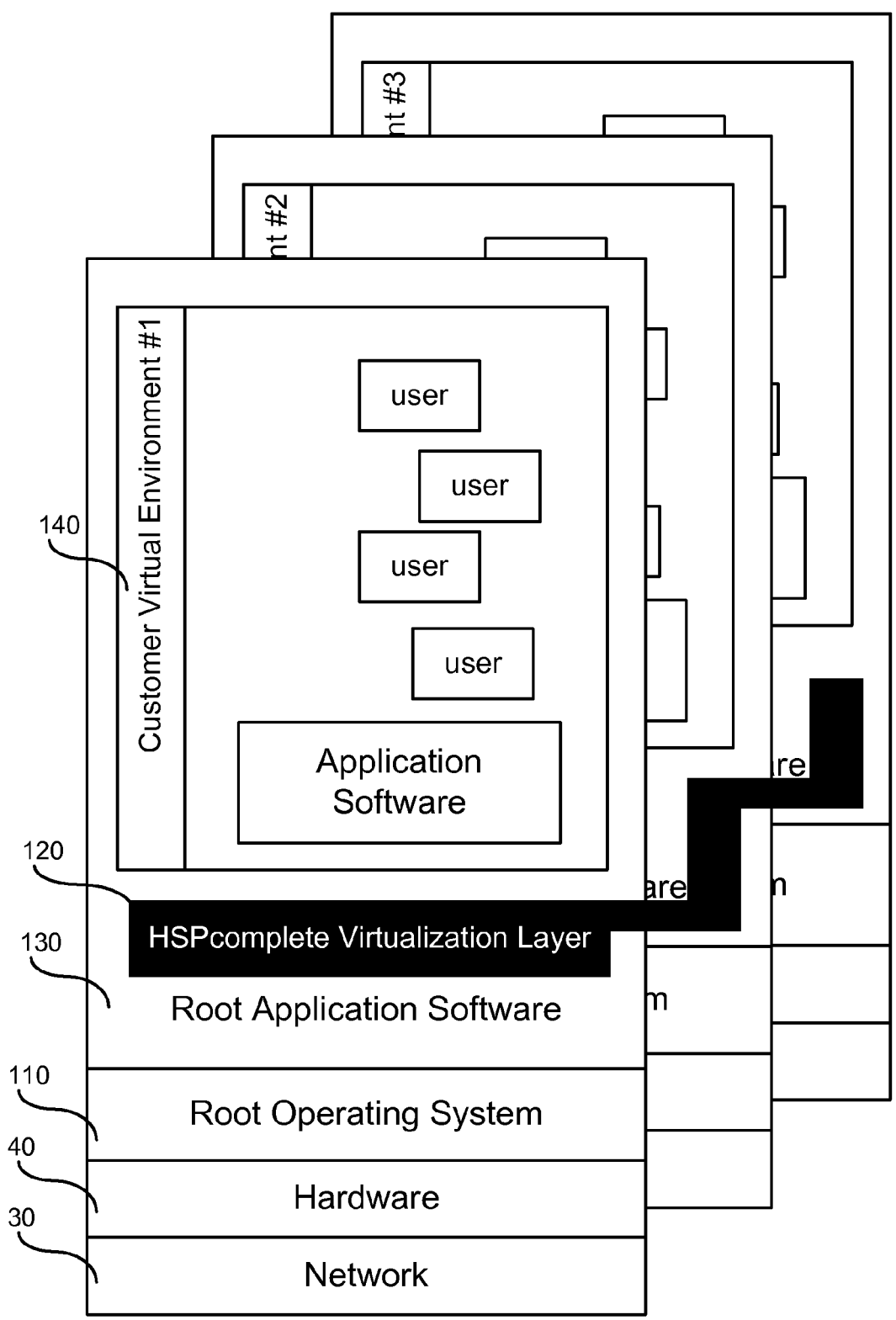
FIG. 2 is a schematic of the virtualization of an operating system technique.

A virtual environment is a fully functional virtual machine that may be easily run by users and operated by an operating system. In contrast to IBM, VMware, and other similar software, virtual environment emulates no hardware. Every virtual environment represents a personal protected machine with a root operating system 110 and root application software 120 that works as a separate workstation or a server as shown in FIG. 2. Several virtual environments may function at one and the same computer at the same time. The OS virtualization layer 130, called HSP complete virtualization layer, allows users to access a virtual environment 140 which represents their personal server with super-user rights that allow software installation, addition of users, etc. Virtual environments of one and the same computer are completely isolated from each other. A user of one virtual environment is unaware of other active virtual environments and their inner processes.

Inside a virtual environment, users are able to install any software supported by the underlying operating system, such as their own web-servers with CGI-scripts and dynamic modules, email servers, ftp servers, RealAudio/Video servers, X-servers with remote access and sshd servers. They also may build their own firewall, use programs compiled from the source code, and install practically any application. In other words, users are able to do whatever they prefer at a separate computer connected to the Internet. Thus the system of virtual environments substantially overlaps the regular set of web-hosting services.

From the point of view of users and system administrators, all the virtual environments constitute a set of highly unified remote computers with simple and well formalized maintenance where installation is reduced to a minimum. High commonality results in highly efficient control tools, which enables the management of a great number of similar virtual environments. From the users' perspective, virtual environments decrease training time and reduce routine operation requirements.

Several computers with a set of installed virtual environments constitute a standardized environment able to provide hosting services to end-users in terms of virtual environments.

Figure 3:
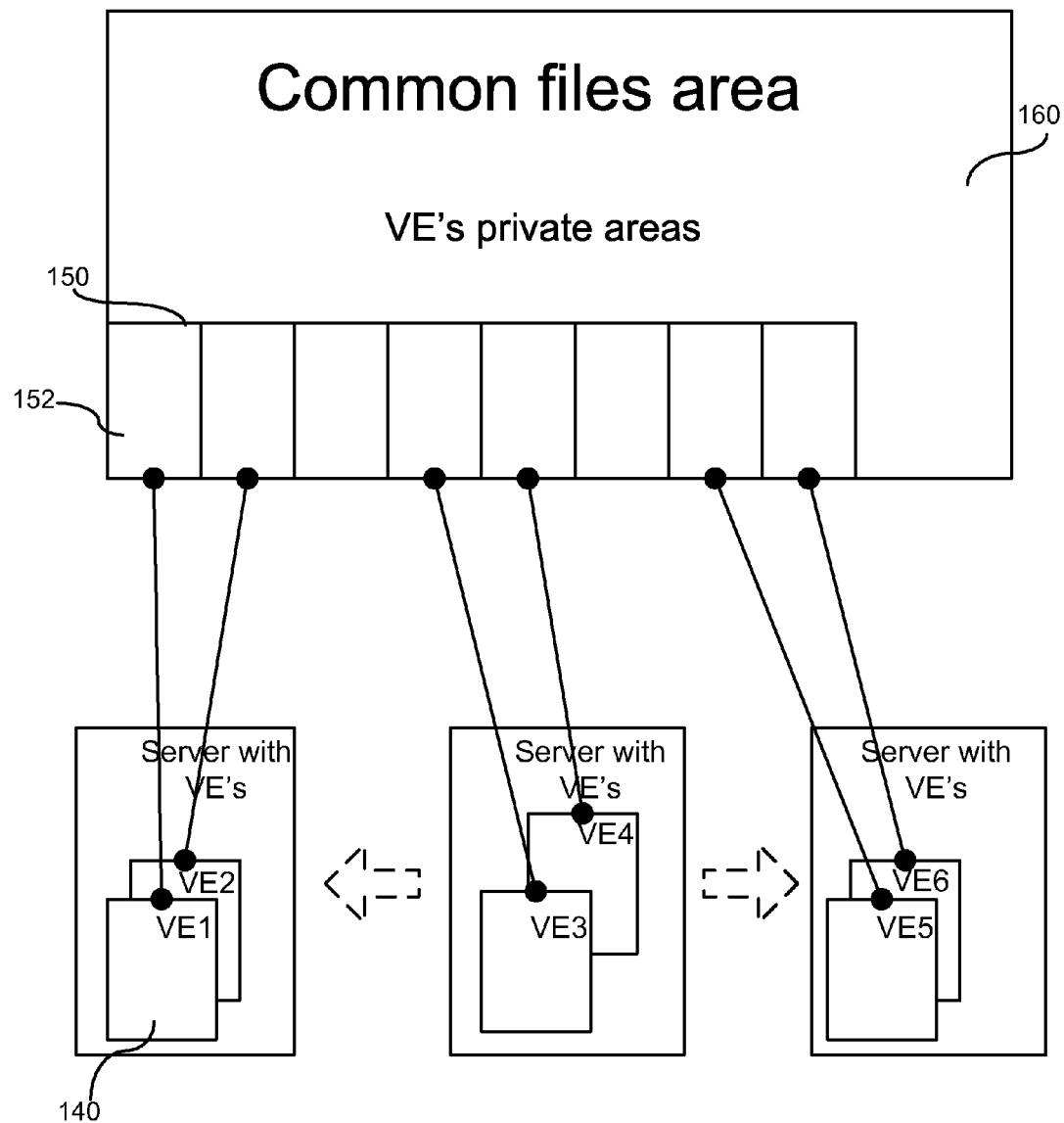
FIG. 3 is a schematic of the usage of a distributed file system for data storage of virtual environments.

In the present invention, a distributed file system is used and all the computers are connected in such a way as to make private data 152 from each virtual environment 140 in the common files area 160 visible at every participating computer, as shown in FIG. 3. Private data 152 for a particular file is stored in the common files area 160 in the virtual environments private data areas 150. This private data 152 is visible from every cluster node and is utilized to restart a virtual environment if necessary. This scheme raises the fault-tolerance level in case of software or hardware failure as all the virtual environments may be easily restarted at any computer of the cluster. The distributed file system makes the data from the failed computer available to users. Additionally, the distributed file system allows successful hardware maintenance as every virtual environment may be easily moved from one computer to another, i.e., virtual environments from a computer under scheduled maintenance can be moved to another machine almost invisibly to users.

Figure 4:
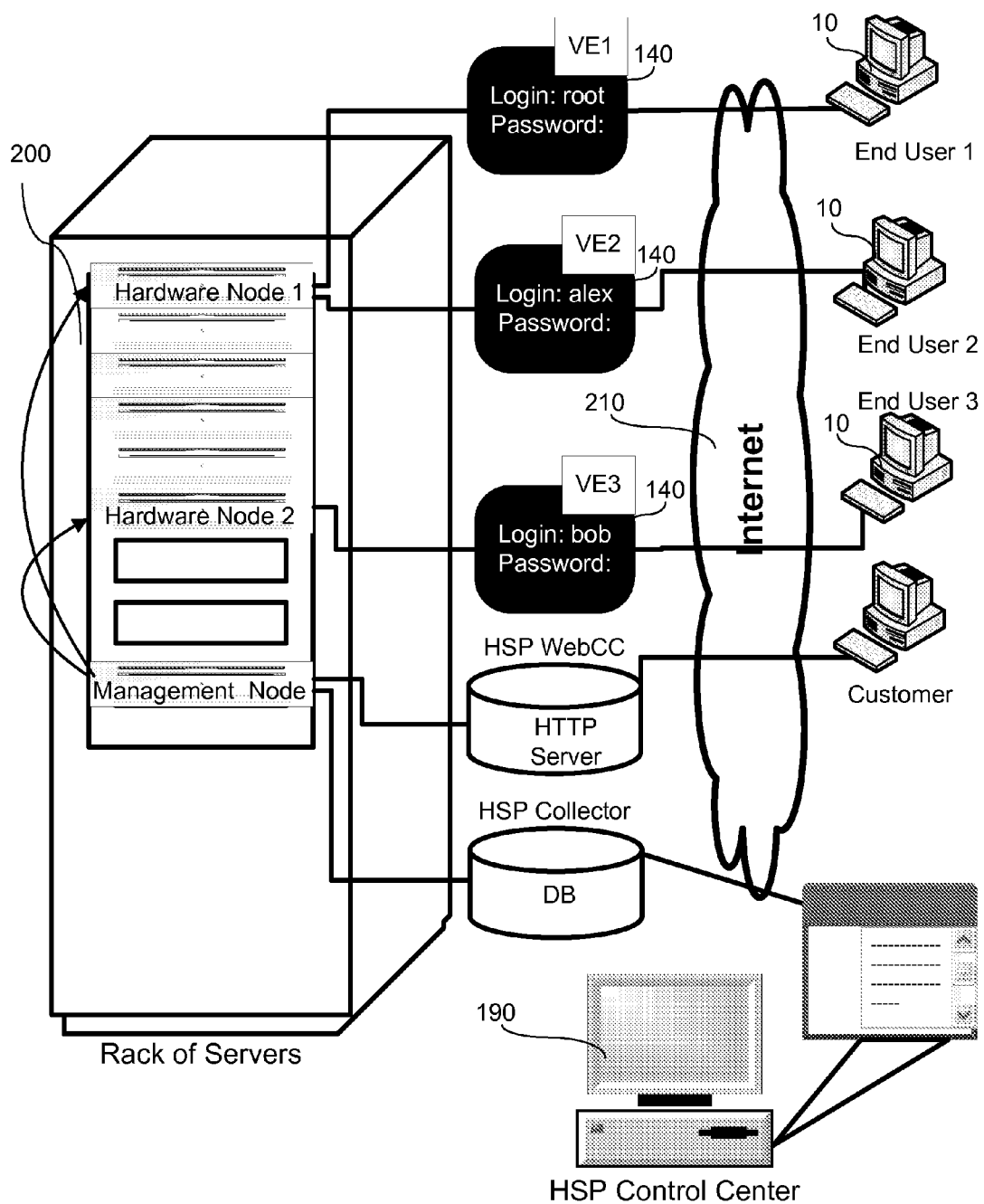
FIG. 4 is a schematic of the general configuration of a cluster and its interaction with end users.

In the present invention, a set of virtual environments 140 is launched and several computers are combined with a distributed file system 180 and a control center 190 into a sharable cluster (See FIG. 4). A cluster consists of a control center 190 and a set of hardware nodes 200 where virtual environments 140 have been launched. End users 10 are linked to their virtual environments 140 via the Internet 210.

Administration is carried out through the control center 190 by means of the Internet 210 or local network. Such a cluster may provide efficient HSP with cost-effective support and a high level of scalability.

Initial installation comes as another challenge for the administration of any multi-computer system. As a rule, initial installation of any computer requires manual intervention by the administrator. This makes the installation of multiple computers a difficult and resource-consuming operation. A computer used as a platform to launch virtual environments is installed automatically in full from a corresponding server or a CDROM. After the fully automatic installation has been completed to the local disk of a newly introduced computer, the computer platform is available for effective control from data center control tools, is connected to the distributed file system, and becomes registered as ready for servicing (i.e., ready for launching new virtual environments). If a server is to be turned off for scheduled maintenance, the server first informs the control center, and the control center moves the launched virtual environments to an alternative server. It is only after this is accomplished that the server is disconnected and the center is notified of the disconnection. Thus, cluster functioning, for the most part, is accomplished without an administrator taking part in the process.

In the past, the absence of remote repairing instruments made an administrator's personal interference indispensable when an operating system software configuration at a dedicated or displaced computer was damaged. Such is not the case for a cluster configuration associated with virtual environments. Even a failed software configuration of a particular virtual environment does not require a user's physical presence.

Figure 5:
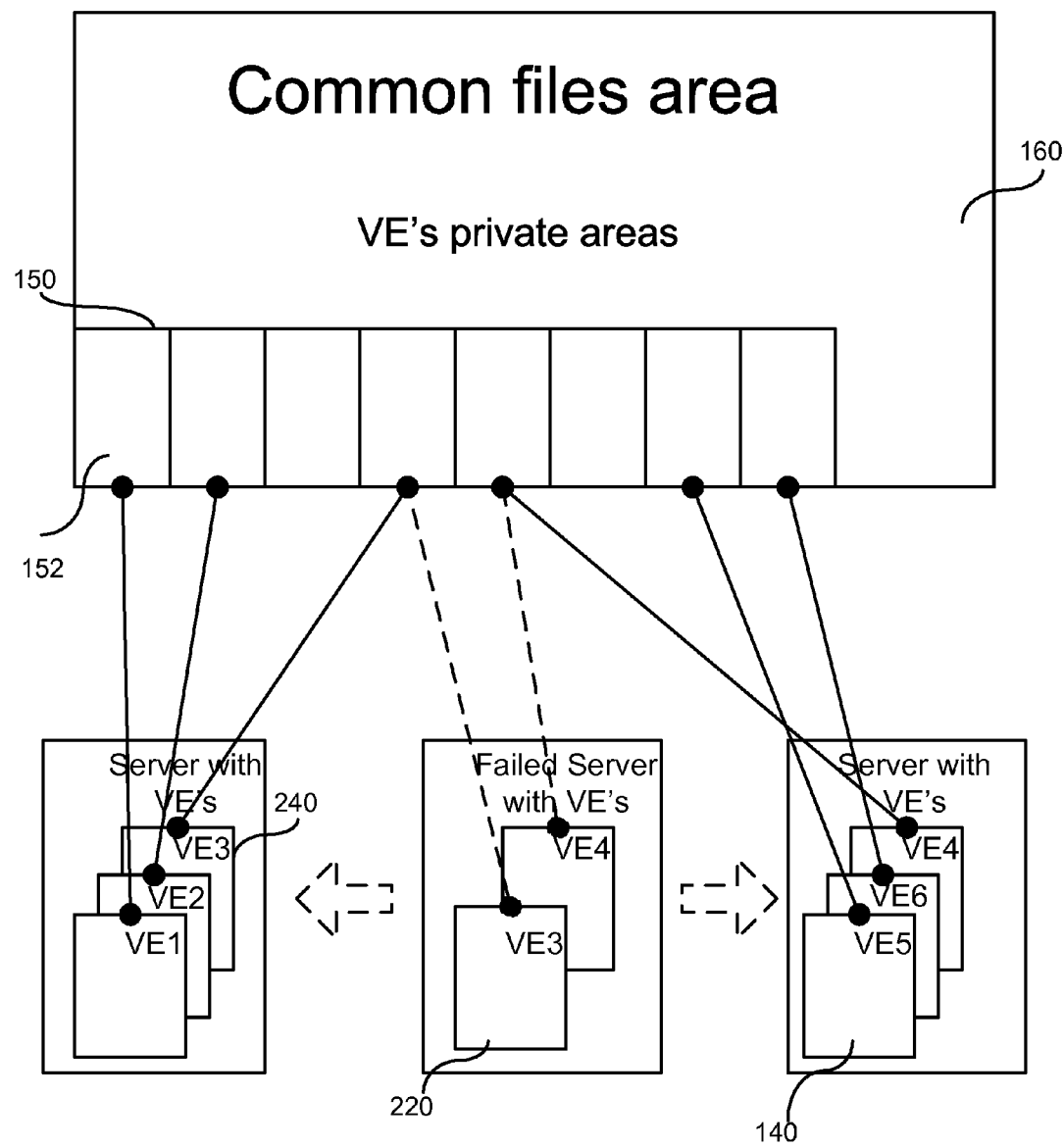
FIG. 5 is a schematic illustrating the installation of virtual environments by means of the distributed file system in case of a cluster node failure.

Files of a failed virtual environment 220 are accessed from a newly created virtual environment 240, allowing a user 10 to repair a failed software configuration as shown in FIG. 5. This is possible because failures of this type do not influence the other virtual environments 140 nor underlying operating system 50. Because the private data 152 of the virtual environments 140 is accessible from every hardware node 200, switching off any cluster node from virtual environment servicing may be backed up by neighboring cluster nodes.

The disclosed system and method has been disclosed by reference to its preferred embodiment. Those of ordinary skill in the art will understand that additional embodiments of the disclosed system and method are made possible by the foregoing disclosure. Such additional embodiments shall fall within the scope and meaning of the appended claims.

What is claimed is:

1. A platform for providing hosting services, comprising:
   a computer cluster formed by a plurality of hardware-independent cluster nodes, said computer cluster including a control center; and
   a plurality of virtual environments running on the computer cluster, wherein each virtual environment virtualizes a full service operating system and does not require dedicated random access memory,
   wherein multiple virtual environments running on the same node share the same operating system and the multiple virtual environments are running service processes, and
   wherein said control center coordinates functions of said plurality of hardware-independent cluster nodes.

2. The platform as defined in claim 1, wherein said plurality of hardware-independent cluster nodes further comprises a distributed file system having a common name space.

3. The platform as defined in claim 2, wherein said distributed file system is integrated and optimized for said computer cluster.

4. The platform as defined in claim 2, wherein said distributed file system stores data for the plurality of virtual environments.

5. The platform as defined in claim 4, wherein each of said plurality of virtual environments further comprises:
 a unique administrative root user for each member of said plurality of virtual environments;
 a file system template and file tree; and
 operating system parameter configuration;
 and further wherein each of said plurality of virtual environments does not require other dedicated hardware resources.

6. The platform as defined in claim 4, wherein said distributed file system further comprises:
 means for making files containing transactions of any file system changes made in at least one of said plurality of virtual environments;
 means for distributing said files containing the transactions to achieve the appropriate level of data accessibility; and
 means for providing access to data from each member of said plurality of cluster nodes.

7. A platform that provides a hosting service, comprising;
 a plurality of hardware-independent cluster nodes forming a computer cluster;
 a plurality of virtual environments supported by the cluster nodes and providing hosting services, wherein each virtual environment virtualizes a full service operating system and does not require dedicated physical random access memory,
 wherein multiple virtual environments running on the same node share the same operating system and the multiple virtual environments are running service processes; and
 a control center that coordinates functions of the computer cluster.

8. The platform of claim 7, wherein the plurality of hardware-independent cluster nodes further comprises a distributed file system having a common name space.

9. The platform of claim 8, wherein the distributed file system is integrated and optimized for the automated computer cluster.

10. The platform of claim 8, wherein the distributed file system stores data for the plurality of virtual environments.

11. The platform of claim 8, wherein the distributed file system further comprises:
 means for making files containing transactions from any file system changes made in at least one of the plurality of virtual environments;
 means for distributing the files containing the transactions to achieve a desired level of data accessibility; and
 means for providing access to the distributed storage system from each of the plurality of cluster nodes.

12. The platform of claim 7, wherein each of the plurality of virtual environments further comprises:
 a unique administrative "root" user for each of the plurality of virtual environments;
 a file system template and a portion of a namespace dedicated to the virtual environments; and
 operating system parameter configuration,
 wherein each of the plurality of virtual environments does not require other dedicated hardware resources.

13. The platform of claim 7, wherein each of the plurality of virtual environments does not require other dedicated hardware resources.

14. The platform of claim 7, wherein each of the plurality of virtual environments does not require locking of hardware resources that are supported by standard operating system mechanisms.

15. The platform of claim 7, wherein each of the plurality of virtual environments does not require emulation of hardware resources.

16. A method for maintaining a platform that provides hosting services, comprising:
 forming a computer cluster from a plurality of hardware-independent cluster nodes;
 establishing a control center for coordinating functions of said plurality of hardware-independent cluster nodes; and
 operating a plurality of virtual environments on the computer cluster, wherein each virtual environment virtualizes a full service operating system and does not require dedicated random access memory, and
 wherein multiple virtual environments running on the same node share the same operating system and the multiple virtual environments are running service processes.

17. The method as defined in claim 16, wherein the step of operating the plurality of virtual environments further comprises implementing a distributed file system having a common name space, wherein said distributed file system is integrated and optimized for each member of said plurality of hardware-independent cluster nodes.

18. The method of claim 17, wherein the step of operating said plurality of virtual environments further comprises:
 establishing a unique administrative root user for each member of said plurality of virtual environments;
 establishing a file system template and file tree for each member of said plurality of virtual environments;
 implementing the operating system parameter configuration for each member of said plurality of virtual environments;
 wherein said step of operating said plurality of virtual environments does not require any other dedicated hardware resources.

19. The method as defined in claim 18, wherein the step of operating said plurality of virtual environments further comprises:
 making files containing transactions of any changes in the file system made in at least one of said plurality of virtual environments;
 distributing the files containing the transactions to achieve the appropriate level of data accessibility; and
 providing access to data stored on the distributed file system from each member of said plurality of cluster nodes.

20. The method as defined in claim 18, wherein the step of operating each member of said plurality of hardware-independent cluster nodes further comprises:
 establishing and configuring network connections;
 providing access to the distributed file system containing the file system template for each virtual environment within said cluster node;
 accessing the resources of said cluster node; and
 utilizing said cluster node for launching new virtual environments.

21. The method as defined in claim 19, wherein the step of providing access to data from each of the plurality of virtual environments at said plurality of hardware independent cluster nodes further comprises restarting each virtual environment of a failed cluster node at another cluster node that has appropriate resources available.

22. A method for utilizing a hosting service platform, comprising:
   requesting a service from an operating system;
   operating a virtual environment for delivery of the service to a user, wherein the virtual environment virtualizes a full service operating system and does not require dedicated random access memory,
   wherein the same operating system can be shared with other virtual environments running on the same computer and the virtual environments are running service processes; and
   utilizing a distributed file system having a common name space for use by the virtual environment.

23. The method of claim 22, wherein the step of operating said virtual environment further comprises installing an application into the virtual environment.

24. The method of claim 22, wherein the step of operating said virtual environment further comprises configuring an application.

25. The method of claim 22, wherein the step of operating said virtual environment further comprises launching an application of said operating system from said virtual environment.

26. The method of claim 22, wherein the step of operating said virtual environment further comprises repairing remotely a failed software configuration of said virtual environment.

27. The method of claim 22, wherein the step of utilizing a distributed file system further comprises achieving a desired fault tolerance level.

28. A method for providing a hosting services platform comprising:
   forming a computer cluster from a plurality of hardware-independent cluster nodes;
   operating a plurality of virtual environments supported by the nodes, wherein each virtual environment virtualizes a full service operating system and does not require dedicated random access memory,
   wherein multiple virtual environments running on the same node share the same operating system and the multiple virtual environments are running service processes;
   providing hosting services from the virtual environments; and
   establishing a control center for managing functions of the computer cluster.

29. The method of claim 28, wherein the step of forming the cluster further comprises implementing a distributed file system having a common name space,
   wherein the distributed file system is integrated and optimized for each of the plurality of hardware-independent cluster nodes.

30. The method of claim 29, wherein the step of operating the plurality of virtual environments further comprises:
   establishing a unique administrative "root" user for each of the plurality of virtual environments;
   establishing a file system template and file tree for each of the plurality of virtual environments; and
   configuring operating system parameters for each of the plurality of virtual environments.

31. The method of claim 30, wherein the step of forming the computer cluster further comprises:
   establishing and configuring physical network connections;
   providing access to the distributed file system containing the file system template for each virtual environment within the cluster;
   utilizing the cluster node for launching the virtual environments; and
   using the virtual environments for accessing resources of the cluster that service user requests.

32. The method of claim 31, wherein the step of providing access to the distributed file system further comprises restarting each virtual environment of a failed cluster node at another cluster node that has available resources.

33. The method of claim 28, wherein the step of operating the plurality of virtual environments does not lock hardware resources that are supported by standard operating system mechanisms.

34. The method of claim 28, wherein the step of operating the plurality of virtual environments further comprises:
   making files containing transactions of any changes in a file system made in at least one of the plurality of virtual environments;
   distributing the files containing the transactions to achieve a desired level of data accessibility; and
   providing access to data from each of the plurality of cluster nodes.

35. The method of claim 28, wherein the virtual environments do not emulate hardware resources.

36. A method for utilizing a hosting service platform in an operating system comprising:
   receiving a request for a service from the operating system;
   operating a virtual environment adapted to respond to the request for service, wherein the virtual environment virtualizes a full service operating system and does not require dedicated random access memory,
   wherein multiple virtual environments running on the same computer share the same operating system and the multiple virtual environments are running service processes; and
   utilizing a distributed file system with a common name space to respond to the request for service.

37. The method of claim 36, wherein the step of operating the virtual environment further comprises installing an application into the virtual environment.

38. The method of claim 37, wherein the step of operating the virtual environment further comprises configuring the application.

39. The method of claim 36, wherein the step of operating the virtual environment further comprises launching the application.

40. The method of claim 36, wherein the step of operating the virtual environment further comprises repairing remotely a failed software configuration of the virtual environment.

41. The method of claim 36, wherein the step of utilizing the distributed file system further comprises achieving a desired fault tolerance level.

42. A computer program product for providing a hosting services platform, comprising a computer usable medium having computer program logic recorded thereon for controlling a processor, the computer program logic comprising:
   computer program code means for automating a computer cluster formed by a plurality of hardware-independent cluster nodes;

computer program code means for operating a plurality of virtual environments supported by the nodes, wherein each virtual environment vitalizes a full service operating system and does not require dedicated random access memory, wherein multiple virtual environments running on the same node share the same operating system and the multiple virtual environments are running service processes;

computer program code means for providing hosting services from virtual environments; and computer program code means for establishing a control center for managing functions of the computer cluster.

* * * * *